United States Patent
Qi et al.

(10) Patent No.: US 11,561,300 B2
(45) Date of Patent: Jan. 24, 2023

(54) CLOSE-RANGE MICROWAVE IMAGING METHOD AND SYSTEM

(71) Applicants: China Communication Technology Co., Ltd., Guangdong (CN); Shenzhen Victooth Terahertz Technology Co., Ltd., Guangdong (CN)

(72) Inventors: Chunchao Qi, Guangdong (CN); Guangsheng Wu, Guangdong (CN); Shukai Zhao, Guangdong (CN); Qian Xiao, Guangdong (CN); Aixian Wang, Guangdong (CN)

(73) Assignees: CHINA COMMUNICATION TECHNOLOGY CO., LTD., Guangdong (CN); SHENZHEN VICTOOTH TERAHERTZ TECHNOLOGY CO., LTD, Guangdong (CN)

( * ) Notice: Subject to any disclaimer, the term of this patent is extended or adjusted under 35 U.S.C. 154(b) by 298 days.

(21) Appl. No.: 16/607,577

(22) PCT Filed: Sep. 4, 2017

(86) PCT No.: PCT/CN2017/100397
§ 371 (c)(1),
(2) Date: Oct. 23, 2019

(87) PCT Pub. No.: WO2018/196245
PCT Pub. Date: Nov. 1, 2018

(65) Prior Publication Data
US 2020/0150265 A1 May 14, 2020

(30) Foreign Application Priority Data
Apr. 28, 2017 (CN) .......................... 201710294345.6

(51) Int. Cl.
*G01S 13/04* (2006.01)
*G01S 13/90* (2006.01)
*G01S 13/88* (2006.01)

(52) U.S. Cl.
CPC .......... *G01S 13/9064* (2019.05); *G01S 13/04* (2013.01); *G01S 13/887* (2013.01)

(58) Field of Classification Search
CPC ..... G01S 13/9064; G01S 13/04; G01S 13/887
See application file for complete search history.

(56) References Cited

U.S. PATENT DOCUMENTS 5,061,935 A * 10/1991 Sekine ...................... G01S 7/20
342/182
5,557,283 A 9/1996 Sheen et al.
(Continued)

FOREIGN PATENT DOCUMENTS

CN    102520408 B    7/2013
CN    104133213 B    1/2017
(Continued)

OTHER PUBLICATIONS

Int'l Search Report dated Jan. 29, 2018 in Int'l Application No. PCT/CN2017/100397.
(Continued)

*Primary Examiner* — Timothy A Brainard
(74) *Attorney, Agent, or Firm* — Panitch Schwarze Belisario & Nadel LLP (57) ABSTRACT

A close-range microwave imaging method includes: implementing Fourier transform in a pre-set rotation axis direction on an echo signal reflected from a target object and acquired by rotating an array antenna around the pre-set rotation axis to obtain a first echo signal, wherein the first echo signal is represented in polar coordinates; multiplying the first echo signal by a pre-set reference function to obtain a second echo signal; converting the second echo signal into rectangular coordinates by a pre-set algorithm to obtain a third echo signal; and implementing three-dimensional Fourier transform on the third echo signal to obtain three-dimensional image data of the target object. By means of the method,
(Continued)

three-dimensional image data of a target object can be obtained fast, fast imaging of the target object can be realized, the data processing amount is small, the imaging precision is high and the method is easy to implement.

10 Claims, 5 Drawing Sheets

(56) References Cited

U.S. PATENT DOCUMENTS

| | | | |
|---|---|---|---|
| 7,397,418 B1* | 7/2008 | Doerry | G01S 7/295 |
| | | | 342/25 R |
| 9,384,586 B1* | 7/2016 | McCusker | G06T 15/20 |
| 10,690,760 B2* | 6/2020 | Melamed | G01N 22/00 |
| 2016/0292879 A1* | 10/2016 | Kampman | G01S 7/10 |

FOREIGN PATENT DOCUMENTS

| | | |
|---|---|---|
| CN | 106556874 B | 10/2018 |
| CN | 107102324 B | 2/2019 |

OTHER PUBLICATIONS

Wen et al, "Active millimeter-wave near-field cylindrical scanning three-dimensional imaging system," Systems Engineering and Electronics, vol. 36, No. 6 (Jun. 2014).

Qiao et al, "Analysis of Active Near-Field Terahertz Imaging for Personal Surveillance," Journal of Microwaves, vol. 31, No. 4 (Aug. 2015).

* cited by examiner

CLOSE-RANGE MICROWAVE IMAGING METHOD AND SYSTEM

CROSS-REFERENCE TO RELATED APPLICATION

This application is a Section 371 of International Application No. PCT/CN2017/100397, filed Sep. 4, 2017, which was published in the Chinese language on Nov. 1, 2018, under International Publication No. WO 2018/196245 A1, which claims priority under 35 U.S.C. § 119(b) to Chinese Patent Application No. 201710294345.6, filed Apr. 28, 2017, the disclosures of which are incorporated herein by reference in their entirety.

TECHNICAL FIELD

The invention belongs to the technical field of close-range microwave imaging, and particularly relates to a close-range microwave imaging method and system.

BACKGROUND

The close-range microwave imaging technology adopts an array antenna rotating around a specific rotation axis to form a curved scan surface and carries out scan imaging on objects by actively transmitting electromagnetic microwaves which can penetrate through the surfaces of the objects to detect metallic or non-metallic prohibited articles hidden in the objects. Because the close-range microwave imaging technology has the characteristics of small radiation dosage, non-ionizing radiation, and the like, it has been widely applied to safety inspection systems to perform human safety inspection tasks.

However, due to the curved scanning path, large data processing amount, and high requirements for imaging precision, the close-range microwave imaging technology is difficult to implement and has not been widely used yet.

SUMMARY

The invention provides a close-range microwave imaging method and system to solve the problems that the close-range microwave imaging technology is difficult to implement and cannot be widely applied due to its curved scanning path, large data processing amount and high requirements etc.

According to one aspect, the invention provides a close-range microwave imaging method. The close-range microwave imaging method comprises:

Carrying out Fourier transform in a pre-set rotation axis direction on an echo signal reflected from a target object and acquired by means of an array antenna rotating around the pre-set rotation axis to obtain a first echo signal, wherein the first echo signal is represented in a form of polar coordinates;

Multiplying the first echo signal by a pre-set reference function to obtain a second echo signal.

Converting the second echo signal into a form of rectangular coordinates by means of a pre-set algorithm to obtain a third echo signal; and Carrying out a three-dimensional Fourier transform on the third echo signal to obtain three-dimensional image data of the target object.

According to another aspect, the invention further provides a close-range microwave imaging system. The close-range microwave imaging system comprises:

A first echo signal processing module used for carrying out Fourier transform in a pre-set rotation axis direction on an echo signal reflected from a target object and acquired by means of an array antenna rotating around the pre-set rotation axis to obtain a first echo signal, wherein the first echo signal is represented in a form of polar coordinates;

A second echo signal processing module used for multiplying the first echo signal by a pre-set reference function to obtain a second echo signal;

A third echo signal processing module used for converting the second echo signal into a form of rectangular coordinates by means of a pre-set algorithm to obtain a third echo signal; and A three-dimensional image data processing module used for carrying out a three-dimensional Fourier transform on the third echo signal to obtain three-dimensional image data of the target object.

According to the invention, Fourier transform, multiplication by a reference function, and coordinate conversion are carried out, in the frequency domain, on an echo signal reflected from a target object and acquired by means of an array antenna rotating around a pre-set rotation axis, and finally, the echo signal in a form of polar coordinates is converted into a form of rectangular coordinates. As a result, three-dimensional image data. of the target object are obtained fast, fast imaging of the target object is realized, the data processing amount is small, the imaging precision is high, and the method and system are easy to implement and suitable for wide application.

BRIEF DESCRIPTION OF THE DRAWINGS

In order to explain the technical solutions of the embodiments of the invention more clearly, a brief description of the accompanying drawings required for illustrating the embodiments is given below. Obviously, the accompanying drawings in the following description are provided for illustrating certain embodiments only, and those ordinarily skilled in the art can obtain other drawings based on the following ones without paying creative effort.

DETAILED DESCRIPTION OF EMBODIMENTS

In order to provide a better understanding to the technical solutions of the invention for those skilled in the art, the technical solutions of the embodiments of the invention are clearly described below with reference to the accompanying drawings. Obviously, the embodiments in the following description are only illustrative ones and are not all possible ones of the invention. All other embodiments acquired by those ordinarily skilled in the art in light of these illustrative ones without paying creative effort should also fall within the scope of the invention.

The term "comprise" involved in the description, claims and accompanying drawings, and any variants of this term refer to non-exclusive inclusion. For instance, process, method, system, product or device comprising a series of steps or modules is not limited to the listed steps or modules, but may also include steps or modules which are not listed, or alternatively include other intrinsic steps or modules of the process, method, system, product or device.

All the embodiments of the invention are implemented on the basis of a close-range microwave imaging system, which consists of an array antenna formed by a pre-set number of linearly-arrayed antennas, a signal transceiver, a mechanical rotating device and a signal processing unit.

In specific applications, the signal processing device may be implemented as a graphics processing unit (GPU).

The mechanical rotating device controls the array antenna to rotate. The signal transceiver transmits a signal and then receives an echo signal reflected from a target object to be imaged during rotating the array antenna. Then the echo signal is sent by the signal transceiver to the signal processing unit to be processed into an imaging result, so that scan imaging of all sampling points on the target object is realized. The close-range microwave imaging system is an arc scanning system or a cylindrical scanning system according to the shape of a scan surface formed in equivalent phase positions during rotating the array antenna.

The operating principle of the cylindrical scanning system is emphatically introduced below.

Figure 1:
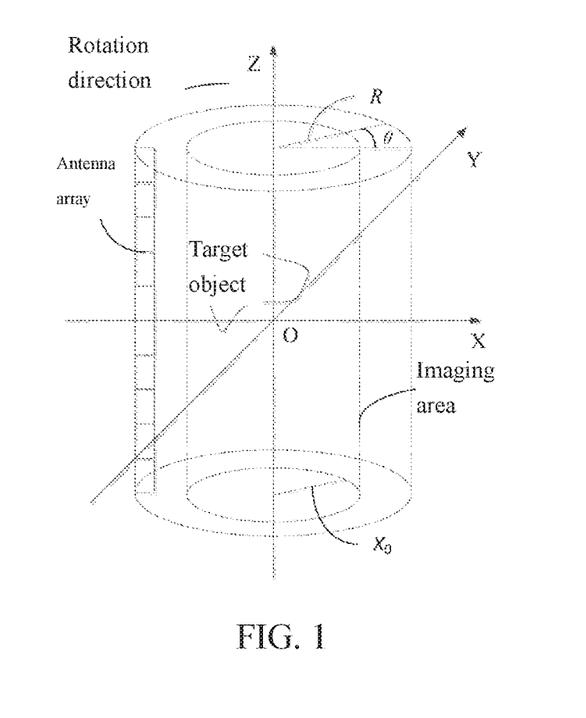
FIG. 1 is a schematic diagram of a cylindrical scanning system in a Cartesian coordinate system in one embodiment of the invention.

As shown in FIG. 1, an X axis is set parallel to the horizontal plane, a Y axis is set orthogonal to the X axis and on the same plane as the X axis, and a Z axis is set in a plane perpendicular to the horizontal plane, wherein the X axis, the Y axis and the Z axis intersect at point O; and a Cartesian coordinate system X-Y-Z-O including the X axis, the Y axis and the Z axis is established.

A plurality of antennas are arrayed in the Z-axis direction perpendicular to the horizontal plane to form an array antenna, and the distance from the array antenna to the geometric central axis (pre-set rotation axis) of the cylindrical scanning system is R (namely the rotation radius of the array antenna is R); after the array antenna rotates around the geometric central axis by one circle (namely 360°), a plurality of equivalent antenna positions which are spaced from one another by equal azimuth angles and equal heights are equivalently formed on a cylindrical surface, and these equivalent antenna positions are called equivalent phase centers of the array antenna. Echo signals reflected from the target object and acquired at the equivalent phase centers of all equivalent antennas are obtained to realize three-dimensional imaging of the target object.

Figure 2:
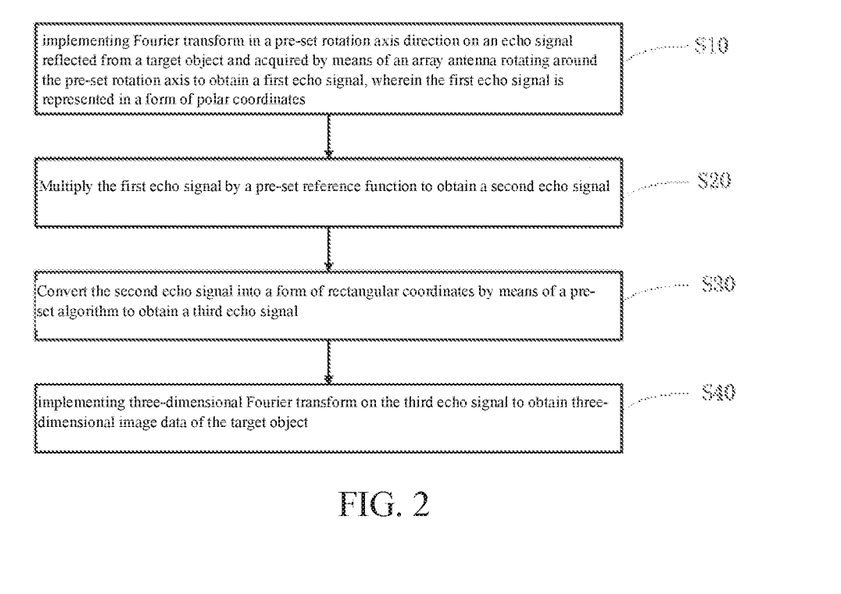
FIG. 2 is a flow block diagram of a close-range microwave imaging method in one embodiment of the invention.

As shown in FIG. 2, one embodiment of the invention provides a close-range microwave imaging method. The close-range microwave imaging method comprises:

Step S10: Fourier transform in a pre-set rotation axis direction is implemented on an echo signal reflected from a target object and acquired by means of rotating an array antenna around the pre-set rotation axis to obtain a first echo signal, wherein the first echo signal is represented in a form of polar coordinates.

In specific applications, the array antenna of the cylindrical scanning system is placed perpendicular to the horizontal plane or parallel to the horizontal plane or is placed obliquely, which can be set according to actual needs; and particularly, parallel fast Fourier transform can be adopted to synchronously process echo signals acquired at the equivalent phase centers of all the equivalent antennas, so as to speed up data processing.

This embodiment is implemented on the basis of the cylindrical scanning system shown in FIG. 1, that is, the array antenna is placed perpendicular to the horizontal plane and the pre-set rotation axis coincides with the Z axis in FIG. 1, which means that the direction of the pre-set rotation axis is the direction of the Z-axis. In step S10, the echo signal includes signals reflected from multiple sampling points on the target object and acquired at the equivalent phase centers of all the equivalent antennas.

In one embodiment, the polar coordinates of the echo signal is expressed as:

$$S_0(\theta, k, z) \quad (1)$$

Wherein, $\theta$ is the rotation angle of the array antenna rotating around the pre-set rotation axis, $k=4\pi f/C$ is the two-way wave number with respect to the pre-set rotation axis, f is the frequency of signals transmitted by the array antenna, C is the speed of light, z is the acquisition height of the echo signal in the pre-set rotation axis direction (namely, the echo signal is acquired at the equivalent phase center of the equivalent antenna having a coordinate z).

In one embodiment, the polar coordinates of the first echo signal is expressed as:

$$S_1(\theta, k, k_z) \quad (2)$$

Wherein $k_z$ is the two-way wave number corresponding to the equivalent antenna having a coordinate z in the pre-set rotation axis direction.

In specific applications, different values of the variables in expression (1) and expression (2) refer to signals corresponding to different equivalent antennas.

Step S20: the first echo signal is multiplied by a pre-set reference function to obtain a second echo signal.

In specific applications, the purpose of multiplying the first echo signal by the pre-set reference function is to realize phase compensation of the first echo signal.

In one embodiment, the second echo signal is expressed as follow:

$$S_2(\theta, k, k_z) = S_1(\theta, k, k_z) \cdot H(f) \quad (3)$$

H(f) is the expression of the pre-set reference function, $H(f) = \exp\{j\sqrt{k^2 - k_z^2} R\}$, and R is the rotation radius of the array antenna rotating around the pre-set rotation axis (please refer to R in FIG. 1); and different values of the variables in expression (3) refer to signals corresponding to different equivalent antennas.

Step S30: the second echo signal is converted into a form of rectangular coordinates by means of a pre-set algorithm to obtain a third echo signal.

In specific applications, the second echo signal is represented in a form of polar coordinates, and the purpose of converting the second echo signal into the form of rectangular coordinates is corresponding the reflected signals acquired at the equivalent phase center of each equivalent antenna to each coordinate position in an imaging area of the Cartesian coordinate system shown in FIG. 1.

In one embodiment, the expression of the rectangular coordinates of the third echo signal is as follow:

$$S_3(k_x, k_y, k_z) \quad (4)$$

$k_x$ is the two-way wave number corresponding to the equivalent antenna having a coordinate x in the X-axis direction, and $k_y$ is the two-way wave number corresponding to the equivalent antenna having a coordinate y in the Y-axis direction; and different values of the variables in expression (4) refer to signals corresponding to different equivalent antennas.

In specific applications, the pre-set algorithm may be an interpolation algorithm, such as nearest neighbor interpolation algorithm, linear interpolation algorithm, polar coordinate interpolation algorithm or spline interpolation algorithm.

Step S40: three-dimensional Fourier transform is carried out on the third echo signal to obtain three-dimensional image data of the target object.

In one embodiment, the expression of the three-dimensional image data of the target object is as follow:

$$S_4(x,y,z) \quad (5)$$

x is the coordinate of the equivalent antenna in the X-axis direction, y is the coordinate of the equivalent antenna in the Y-axis direction, and z is the coordinate of the equivalent antenna in the Z-axis direction.

In one embodiment, after step S40, the close-range microwave imaging method further comprises the following step:

Two-dimensional image information along a pre-set plane is extracted from the three-dimensional image data to obtain a two-dimensional image of the target object along the pre-set plane, wherein the pre-set plane is an X-Y plane, an X-Z plane, or a Z-Y plane in a three-dimensional rectangular coordinate system;

Alternatively, three-dimensional image information is extracted from the three-dimensional image data to obtain a three-dimensional image of the target object.

In specific applications, the three-dimensional rectangular coordinate system is the Cartesian coordinate system shown in FIG. 1.

In specific applications, because the echo signals reflected from the sampling points on the target object correspond to a set of rectangular coordinate values in the three-dimensional image data represented in the form of rectangular coordinates, rectangular coordinate values corresponding to the sampling points in a two-dimensional area of the target object can be extracted from the three-dimensional image data according to actual requirements to obtain two-dimensional image information of the two-dimensional area. Similarly, rectangular coordinate values corresponding to the sampling points in a three-dimensional area of the target object can be extracted from the three-dimensional image data to obtain three-dimensional image information of the three-dimensional area.

In this embodiment, Fourier transform, multiplication by a reference function and coordinate conversion are carried out, in the frequency domain, on the echo signal reflected from the target object and acquired by rotating the array antenna around the pre-set rotation axis, and finally, the echo signal in a form of polar coordinates is converted into the form of rectangular coordinates, so that the three-dimensional image data of the target object are obtained fast Consequently, fast imaging of the target object is realized, the data processing amount is small, the imaging precision is high, and the method is easy to implement and suitable for wide application.

Figure 3:
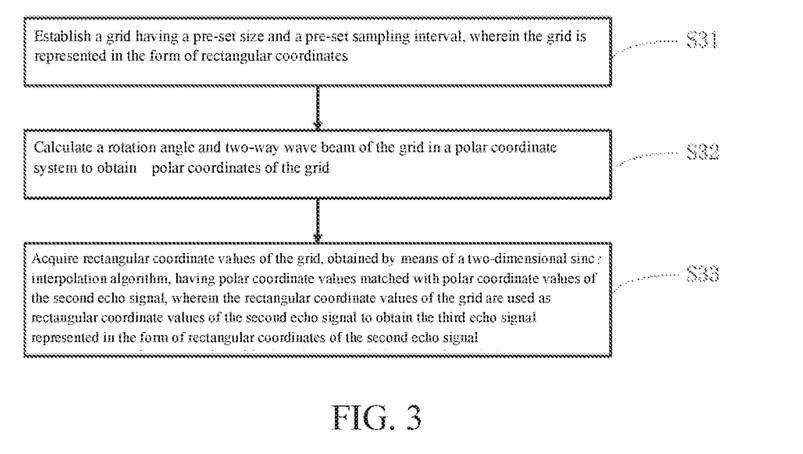
FIG. 3 is a flow block diagram of step S30 in FIG. 2 in one embodiment of the invention.

As shown in FIG. 3, in one embodiment of the invention, step S30 in the embodiment shown in FIG. 2 specifically comprises:

Step S31: a grid having a pre-set size and a pre-set sampling interval is established, wherein the grid is represented in the form of rectangular coordinates.

In one embodiment, the expression of the grid is as follows:

$$(k_x, k_y) \quad (6)$$

In specific applications, different values of the variables in expression (6) refer to different grids in the rectangular coordinate system, and the pre-set size refers to the area of each grid and can be set according to actual requirements, as long as both the maximum length and the maximum width of each grid are greater than $[-4\pi f_{max}/C, 4\pi f_{max}/C]$, which means that $k_x$ and $k_y$ in $(k_x, k_y)$ should meet the following relation:

$$\begin{cases} (k_x)_{max} > 4\pi f_{max}/C \\ (k_x)_{min} < -4\pi f_{max}/C \\ (k_y)_{max} > 4\pi f_{max}/C \\ (k_y)_{min} < -4\pi f_{max}/C \end{cases} \quad (7)$$

Wherein, $f_{max}$ is the maximum frequency value of the transmitting signal.

In specific applications, the pre-set sampling interval refers to the distance between every two adjacent grids (namely the straight-line distance between the geometric center points of every two adjacent grids wherein the distance between every two adjacent grids arrayed in the X-axis direction is set as $\Delta k_x$, the distance between every two adjacent grids arrayed in the Y-axis direction is set as $\Delta k_y$, and both $\Delta k_x$ and $\Delta k_y$ should meet $$\begin{cases} \Delta k_x < \dfrac{\pi}{x_o} \\ \Delta k_y < \dfrac{\pi}{x_o} \end{cases} \quad (8)$$

the following relation:

Wherein, $X_o$ is the radius of the imaging area.

As shown in FIG. 1, in specific applications, the imaging area formed by all the grids obtained by changing the parameters in the grid expression under the condition where expression (7) and expression (8) are met is a cylindrical imaging area having a radius $X_o$ in FIG. 1.

Step S32: a rotation angle and two-way wave beam of the grid in a polar coordinate system are calculated to obtain the polar coordinates of the grid.

In one embodiment, the expression of the polar coordinates of the grid is as follows:

$$(\theta, k') \quad (9)$$

Wherein, $\theta'$ refers to the rotation angle, $k'$ refers to the two-way wave number, $\theta'$ and $k'$ are obtained by calculating according to parameters $k_x$ and $k_y$ of the grid, and the expressions of $\theta'$ and $k'$ are follows:

$$\begin{cases} k' = \sqrt{k_x^2 + k_y^2 + k_z^2} \\ \theta' = \text{angle}(-k_x - jk_y) \end{cases} \quad (10)$$

Wherein, j represents an imaginary number, the function angle( ) represents a solution to the phase angle of a complex number.

Step S33: rectangular coordinate values of the grid, obtained by means of a two-dimensional sine interpolation algorithm, having the polar coordinate values matched with polar coordinate values of the second echo signal, are used as rectangular coordinate values of the second echo signal, so that the third echo signal represented in the form rectangular coordinates of the second echo signal is obtained.

In specific applications, step S33 is specifically implemented in such a manner: the second echo signal having the same polar coordinate values as the grid and the grid represented in a form of polar coordinates are selected, the rectangular coordinate values of the second echo signal are obtained by acquiring the rectangular coordinate values of the grid, then the form of rectangular coordinates of the second echo signal is restored according to the rectangular coordinate values, i.e., obtaining the third echo signal, and in this way, the second echo signal represented in a form of polar coordinates is converted into the form of rectangular coordinates.

In one embodiment, S33 specifically comprises:

The third echo signal $S_3(k_x, k_y, k_z)$ is obtained according to the following interpolation formula:

$$S_3(k_x, k_y, k_z) = \int_k \int_\theta (\theta, k, k_z) \cdot \mathrm{sinc}\left(\frac{k-k'}{dk}\right) \cdot \mathrm{sinc}\left(\frac{\theta-\theta'}{d\theta}\right) dk d\theta$$

Wherein dk is the sampling interval of k, dθ is the sampling interval of θ.

In specific applications, the number of interpolation points adopted for the two-dimensional sine interpolation can be selected according to actual requirements. For instance, N*M interpolation points are adopted, wherein N is an integer ranging from 4 to 32, and M is an integer ranging from 4 to 32.

In this embodiment, a grid in a form of polar coordinates is established, and the form of rectangular coordinates of the grid is obtained by calculation; then the second echo signal is corresponded to the grid having the same polar coordinates through the two-dimensional sinc interpolation algorithm, so that the rectangular coordinate values of the second echo signal can be obtained according to the rectangular coordinate values of the grid; and finally, the third echo signal represented in the form of the rectangular coordinates of the second echo signal is obtained. The coordinate conversion process is simple, and a fast coordinate conversion to signal is realized.

Figure 4:
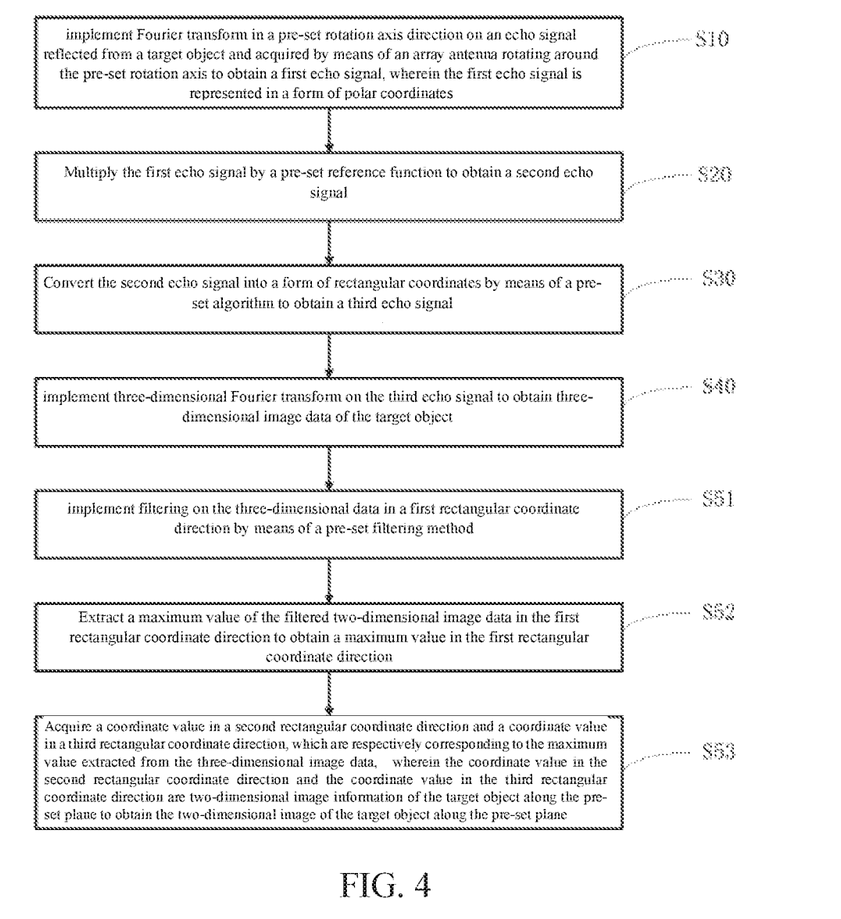
FIG. 4 is a flow block diagram of the close-range microwave imaging method in another embodiment of the invention.

As shown in FIG. 4, in one embodiment of the invention, the step of "extracting two-dimensional image information from the three-dimensional image data to obtain a two-dimensional image of the target object" in the embodiment shown in FIG. 2 specifically comprises:

Step S51: filtering is implemented out on the three-dimensional data in a first rectangular coordinate direction by means of a pre-set filtering method.

In specific applications, the pre-set filtering method may comprise median filtering or low-pass filtering. The first rectangular coordinate direction can be selected according to actual requirements. For instance, in order to obtain a two-dimensional image of the target object in the X-Y plane shown in FIG. 1, the first rectangular coordinate direction is set as the Z-axis direction; in order to obtain a two-dimensional image of the target object in the X-Z plane shown in FIG. 1, the first rectangular coordinate direction is set as the Y-axis direction; and in order to obtain a two-dimensional image of the target object in the Z-Y plane shown in FIG. 1, the first rectangular coordinate direction is set as the X-axis direction.

Step S52: a maximum value of the filtered three-dimensional image data is extracted in the first rectangular coordinate direction to obtain the maximum value in the first rectangular coordinate direction.

In specific applications, in step S52, a maximum absolute value in the first rectangular coordinate direction is extracted from the three-dimensional image data, namely, the maximum absolute value $|S_4(x, y, z)|$ of the three-dimensional image data in the first rectangular coordinate direction is extracted.

Step S53: a coordinate value in a second rectangular coordinate direction and a coordinate value in a third rectangular coordinate direction, which are respectively corresponding to the maximum value extracted from the three-dimensional image data, are acquired to be two-dimensional image information of the target object along the pre-set plane, so as to obtain the two-dimensional image of the target object along the pre-set plane.

In specific applications, the first rectangular coordinate direction, the second rectangular coordinate direction and the third rectangular coordinate direction are different and each represents one of the X-axis direction, the Y-axis direction and the Z-axis direction in the rectangular coordinate system shown in FIG. 1.

In one embodiment, if the pre-set plane is the X-Y plane, the first rectangular coordinate direction is the Z-axis direction, the second rectangular coordinate direction and the third rectangular coordinate direction respectively refer to the X-axis direction and the Y-axis direction, and the expression of the two-dimensional image is as follow:

$$S_5(x,y)=S_4(x,y,z=z_{max}) \qquad (11)$$

Wherein $z_{max}$ represents the coordinate of the maximum absolute value in the Z-axis direction extracted from the three-dimensional image data;

In one embodiment, if the pre-set plane is the X-Z plane, the first rectangular coordinate direction is the Y-axis direction, the second rectangular coordinate direction and the third rectangular coordinate direction respectively refer to the X-axis direction and the Z-axis direction, and the expression of the two-dimensional image is as follows:

$$S_6(x,z)=S_4(x,y=y_{max},z) \qquad (12)$$

Wherein $y_{max}$ represents the coordinate of the maximum absolute value in the Y-axis direction extracted from the three-dimensional image data.

In one embodiment, if the pre-set plane is the Y-Z plane, the first rectangular coordinate direction is the X-axis direction, the second rectangular coordinate direction and the third rectangular coordinate direction respectively refer to the Y-axis direction and the Z-axis direction, and the expression of the two-dimensional image is as follows:

$$S_7(y,z)=S_4(x=x_{max},y,z) \qquad (13)$$

Wherein $x_{max}$ represents the coordinate of the maximum absolute value in the X-axis direction extracted from the three-dimensional image data.

In specific applications, the step of "extracting three-dimensional image information from the three-dimensional image data to obtain a three-dimensional image of the target object" in the embodiment shown in FIG. 2 is implemented by synchronously or sequentially obtaining all two-dimensional image information included in the three-dimensional image. That is, two-dimensional image information of a plurality of different two-dimensional images corresponding to the three-dimensional image is synchronously or sequentially obtained according to steps S51-S53; and then all the two-dimensional information is combined into three-dimensional image information to obtain the three-dimensional image of the target object.

In this embodiment, coordinate information corresponding to the two-dimensional image information of the target object is obtained by means of coordinate extraction, so that the two-dimensional image of the target object can be obtained fast, and then the three-dimensional image of the target object can be obtained fast according to the two-dimensional image of the target object.

Figure 5:
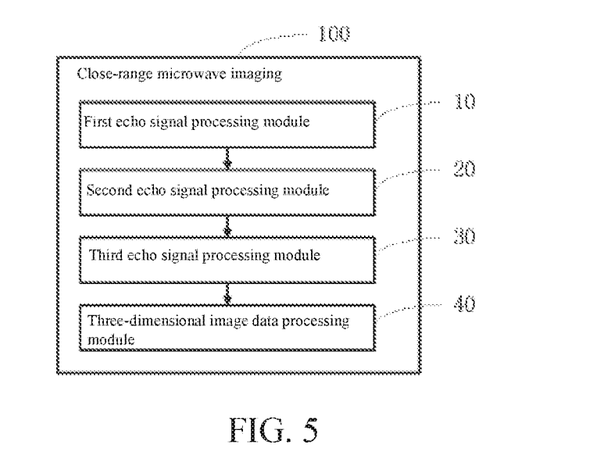
FIG. 5 is a structural block diagram of a close-range microwave imaging system in one embodiment of the invention.

As shown in FIG. 5, one embodiment of the invention provides a close-range microwave imaging system 100 used for performing the steps of the embodiment shown in FIG. 2. The close-range microwave imaging system 100 comprises:

A first echo signal processing module 10 used for implementing Fourier transform in a pre-set rotation axis direction on an echo signal reflected from a target object and acquired by means of rotating an array antenna around the pre-set rotation axis to obtain a first echo signal, wherein the first echo signal is represented in a form of polar coordinates;

A second echo signal processing module 20 used for multiplying the first echo signal by a pre-set reference function to obtain a second echo signal;

A third echo signal processing module 30 used for converting the second echo signal into a form of rectangular coordinates by means of a pre-set algorithm to obtain a third echo signal; and A three-dimensional image data. processing module 40 used for carrying out three-dimensional Fourier transform on the third echo signal to obtain three-dimensional image data of the target object.

In one embodiment, the close-range microwave imaging system 100 further comprises:

A two-dimensional image extraction module used for extracting two-dimensional image information along a pre-set plane from the three-dimensional image data to obtain a two-dimensional image of the target object along the pre-set plane, wherein the pre-set plane is an X-Y plane, an X-Z plane, or a Z-Y plane in a three-dimensional rectangular coordinate system; and A three-dimensional image extraction module used for extracting three-dimensional image information from the three-dimensional image data to obtain a three-dimensional image of the target object.

Figure 6:
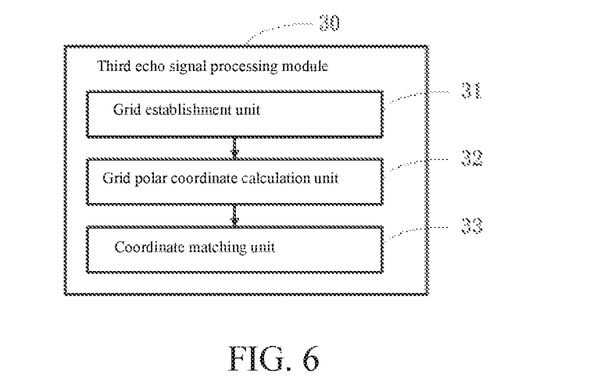
FIG. 6 is a structural block diagram of the third echo signal processing module in FIG. 5 in one embodiment of the invention.

As shown in FIG. 6, in one embodiment of the invention, the third echo signal processing module 30 shown in FIG. 5 is configured to perform the steps of the method in the embodiment shown in FIG. 3 and comprises:

A grid establishment unit 31 used for establishing a grid having a pre-set size and a pre-set sampling interval, wherein the grid is represented in the form of rectangular coordinates:

A grid polar coordinate calculation unit 32 used for calculating a rotation angle and two-way wave beam of the grid in a polar coordinate system to obtain polar coordinates of the grid; and A coordinate matching unit 33 used for acquiring rectangular coordinate values of the grid having the polar coordinate values matched with polar coordinate values of the second echo signal by means of a two-dimensional sinc interpolation algorithm, wherein the rectangular coordinate values of the grid are used as rectangular coordinate values of the second echo signal to obtain the third echo signal represented in the form of rectangular coordinates of the second echo signal.

In this embodiment, a grid in a form of polar coordinates is established, and the form of rectangular coordinates of the grid is obtained by calculation; then the second echo signal is corresponded to the grid having the same polar coordinates as the second echo signal through the two-dimensional sinc interpolation algorithm, so that the rectangular coordinate values of the second echo signal can be obtained according to the rectangular coordinate values of the grid; and finally, the third echo signal represented in the form of the rectangular coordinates of the second echo signal is obtained. The coordinate conversion process is simple, and a fast coordinate conversion of the signal is realized.

Figure 7:
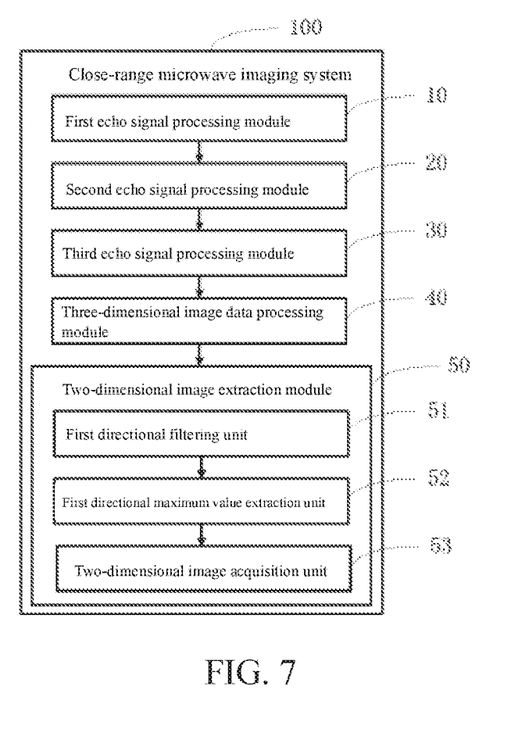
FIG. 7 is a structural block diagram of the close-range microwave imaging system in another embodiment of the invention.

As shown in FIG. 7, in one embodiment of the invention, the two-dimensional image extraction module 50 in the embodiment shown in FIG. 5 is configured to perform the steps of the method in the embodiment shown in FIG. 4 and comprises:

A first directional filtering unit 51 used for implementing filtering on the three-dimensional image data in a first rectangular coordinate direction by means of a pre-set filtering method;

A first directional maximum value extraction unit 52 used for extracting a maximum value from the filtered three-dimensional image data in the first rectangular coordinate direction to obtain the maximum value in the first rectangular coordinate direction; and A two-dimensional image acquisition unit 53 used for acquiring a coordinate value in a second rectangular coordinate direction and a coordinate value in a third rectangular coordinate direction, which are respectively corresponding to the maximum value extracted from the three-dimensional image data, wherein the coordinate value in the second rectangular coordinate direction and the coordinate value in the third rectangular coordinate direction are two-dimensional image information of the target object along the pre-set plane to obtain the two-dimensional image of the target object along the pre-set plane.

In one embodiment, the three-dimensional image extraction module in the embodiment shown in FIG. 5 comprises a two-dimensional image extraction module used for synchronously or sequentially extracting two-dimensional information of a plurality of different two-dimensional images corresponding to a three-dimensional image and then combining the two-dimensional image information into three-dimensional image information to obtain the three-dimensional image of the target object.

In this embodiment. Fourier transform, multiplication by a reference function, and coordinate conversion are carried out, in the frequency domain, on an echo signal reflected from a target object and acquired by means of rotating an array antenna around a pre-set rotation axis, and finally, the echo signal in a form of polar coordinates is converted into a form of rectangular coordinates, so that three-dimensional image data of the target object are obtained fast, fast imaging of the target object is realized, the data. processing amount is small, the imaging precision is high, and the close-range microwave imaging system is easy to implement and suitable for wide application.

The modules or units in all the embodiments of the invention can be implemented through a general purpose integrated circuit such as a CPU (Central Processing Unit), or an ASIC (Application Specific Integrated Circuit).

The steps of the method in all the embodiments of the invention can be reordered, combined, or omitted according to actual requirements.

The modules or units of the device in all the embodiments of the invention can be combined, partitioned, or omitted according to actual requirements.

It would be appreciated by those ordinarily skilled in the art that all or part of the procedures of the method in the above embodiments can be implemented by relevant hardware instructed by a computer program, wherein the program may be stored in a computer-readable storage medium, and when the program runs, the procedures of the method in the above embodiments can be performed. The storage medium is a disk, a compact disc (CD), a read-only memory (ROM), a random access memory (RAM), or the like.

The embodiments described above are only preferred ones of the invention, and are not intended to limit the invention. Any modifications, equivalent substitutes and improvements obtained based on the spirit and principle of the invention should also fall within the scope of the invention.

What is claimed is:

1. A close-range microwave imaging method, comprising:
    implementing Fourier transform in a pre-set rotation axis direction on an echo signal reflected from a target object and acquired by means of rotating an array antenna around the pre-set rotation axis to obtain a first echo signal, wherein the first echo signal is represented in a form of polar coordinates defined at least by a rotation angle of the array antenna rotating around the pre-set rotation axis and a two-way wave number with respect to the pre-set rotation axis;
    multiplying the first echo signal by a pre-set reference function to obtain a second echo signal;
    converting the second echo signal into a form of rectangular coordinates by means of a pre-set algorithm to obtain a third echo signal;
    implementing three-dimensional Fourier transform on the third echo signal to obtain three-dimensional image data of the target object; and
    extracting two-dimensional image information along a pre-set plane from the three-dimensional image data using maximum coordinate extraction to obtain a two-dimensional image of the target object along the pre-set plane.

2. The close-range microwave imaging method according to claim 1, wherein the converting the second echo signal into a form of rectangular coordinates by means of a pre-set algorithm to obtain a third echo signal comprises:
    establishing a grid having a pre-set size and a pre-set sampling interval, wherein the grid is represented in the form of rectangular coordinates;
    calculating a rotation angle and two-way wave beam of the grid in a polar coordinate system to obtain polar coordinates of the grid; and
    acquiring rectangular coordinate values of the grid, obtained by means of a two-dimensional sinc interpolation algorithm, having polar coordinate values matched with polar coordinate values of the second echo signal, wherein the rectangular coordinate values of the grid are used as rectangular coordinate values of the second echo signal to obtain the third echo signal represented in the form of rectangular coordinates of the second echo signal.

3. The close-range microwave imaging method according to claim 1,
    wherein the pre-set plane is an X-Y plane, an X-Z plane, or a Z-Y plane in a three-dimensional rectangular coordinate system.

4. The close-range microwave imaging method according to claim 3, wherein the extracting two-dimensional image information along a pre-set plane from the three-dimensional image data to obtain a two-dimensional image of the target object along the pre-set plane comprises:
    implementing filtering on the three-dimensional data in a first rectangular coordinate direction by means of a pre-set filtering method;
    extracting a maximum value of the filtered two-dimensional image data in the first rectangular coordinate direction to obtain a maximum value in the first rectangular coordinate direction; and
    acquiring a coordinate value in a second rectangular coordinate direction and a coordinate value in a third rectangular coordinate direction, which are respectively corresponding to the maximum value extracted from the three-dimensional image data, wherein the coordinate value in the second rectangular coordinate direction and the coordinate value in the third rectangular coordinate direction are used as two-dimensional image information of the target object along the pre-set plane to obtain the two-dimensional image of the target object along the pre-set plane.

5. The close-range microwave imaging method according to claim 1, further comprising:
    extracting three-dimensional image information from the three-dimensional image data to obtain a three-dimensional image of the target object.

6. A close-range microwave imaging system, comprising:
    a first echo signal processing module used for implementing Fourier transform in a pre-set rotation axis direction on an echo signal reflected from a target object and acquired by means of rotating an array antenna around the pre-set rotation axis to obtain a first echo signal, wherein the first echo signal is represented in a form of polar coordinates defined at least by a rotation angle of the array antenna rotating around the pre-set rotation axis and a two-way wave number with respect to the pre-set rotation axis;
    a second echo signal processing module used for multiplying the first echo signal by a pre-set reference function to obtain a second echo signal;
    a third echo signal processing module used for converting the second echo signal into a form of rectangular coordinates by means of a pre-set algorithm to obtain a third echo signal;
    a three-dimensional image data processing module used for implementing three-dimensional Fourier transform on the third echo signal to obtain three-dimensional image data of the target object; and
    a two-dimensional image extraction module used for extracting two-dimensional image information along a pre-set plane from the three-dimensional image data using maximum coordinate extraction to obtain a two-dimensional image of the target object along the pre-set plane.

7. The close-range microwave imaging system according to claim 6, wherein the third echo signal processing module comprises:
    a grid establishment unit used for establishing a grid having a pre-set size and a pre-set sampling interval, wherein the grid is represented in the form of rectangular coordinates;
    a grid polar coordinate calculation unit used for calculating a rotation angle and two-way wave beam of the grid in a polar coordinate system to obtain polar coordinates of the grid; and a coordinate matching unit used for acquiring rectangular coordinate values of the grid, obtained by means of a two-dimensional sinc interpolation algorithm, having polar coordinate values matched with polar coordinate values of the second echo signal, wherein the rectangular coordinate values of the grid are used as rectangular coordinate values of the second echo signal to obtain the third echo signal represented in the form of rectangular coordinates of the second echo signal.

8. The close-range microwave imaging system according to claim 6,
wherein the pre-set plane is an X-Y plane, an X-Z plane, or a Z-Y plane in a three-dimensional rectangular coordinate system.

9. The close-range microwave imaging system according to claim 8, wherein two-dimensional image extraction module comprises:
a first directional filtering unit used for implemeting filtering on the three-dimensional image data in a first rectangular coordinate direction by means of a pre-set filtering method;
a first directional maximum value extraction unit used for extracting a maximum value from the filtered three-dimensional image data in the first rectangular coordinate direction to obtain a maximum value in the first rectangular coordinate direction; and
a two-dimensional image acquisition unit used for acquiring a coordinate value in a second rectangular coordinate direction and a coordinate value in a third rectangular coordinate direction, which are respectively corresponding to the maximum value extracted from the three-dimensional image data, wherein the coordinate value in the second rectangular coordinate direction and the coordinate value in the third rectangular coordinate direction are two-dimensional image information of the target object along the pre-set plane to obtain the two-dimensional image of the target object along the pre-set plane.

10. The close-range microwave imaging system according to claim 6, wherein the close-range microwave imaging system further comprises:
a three-dimensional image extraction module used for extracting three-dimensional image information from the three-dimensional image data to obtain a three-dimensional image of the target object.

* * * * *